(No Model.)
J. H. ROGERS.
PIPE TELEPHONE.
No. 292,858. Patented Feb. 5, 1884.
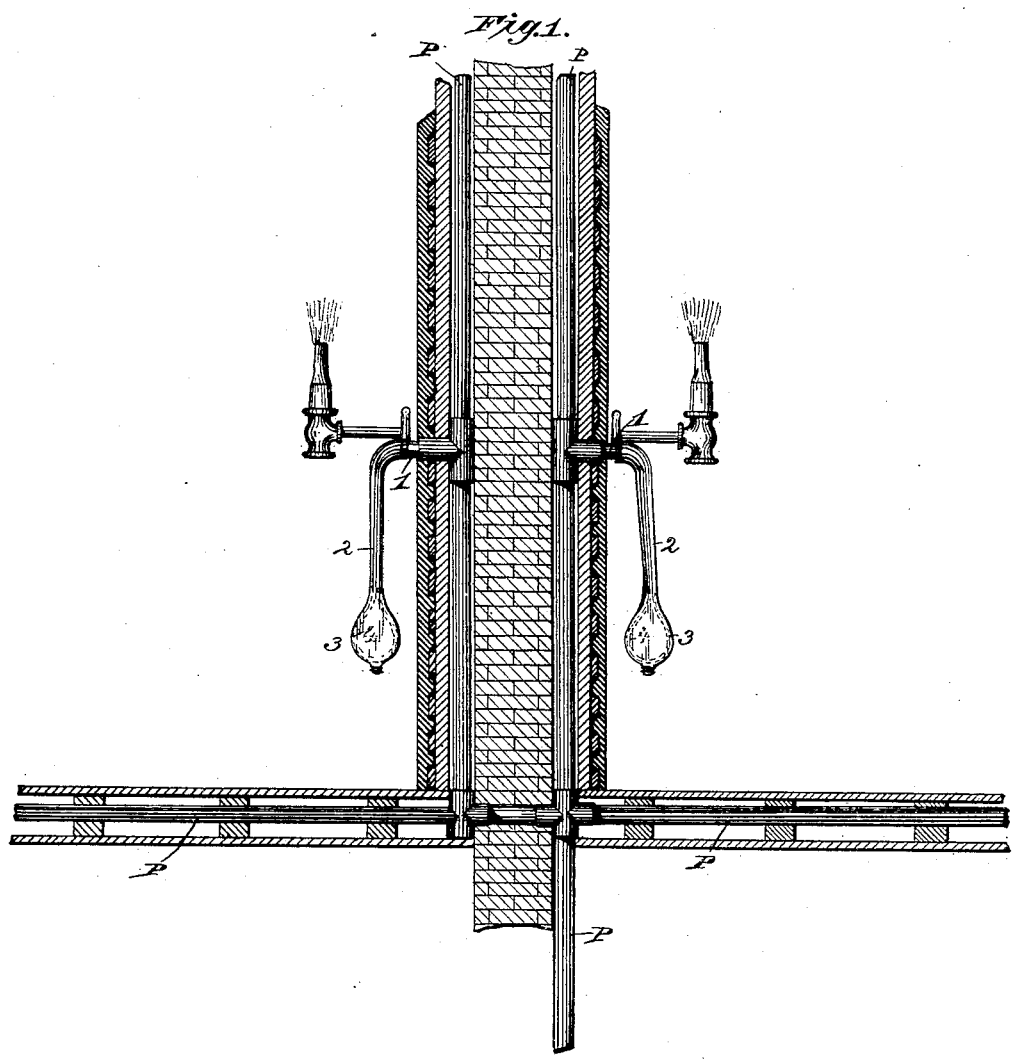

(No Model.)  J. H. ROGERS.  2 Sheets—Sheet 2.
PIPE TELEPHONE.
No. 292,858.  Patented Feb. 5, 1884.
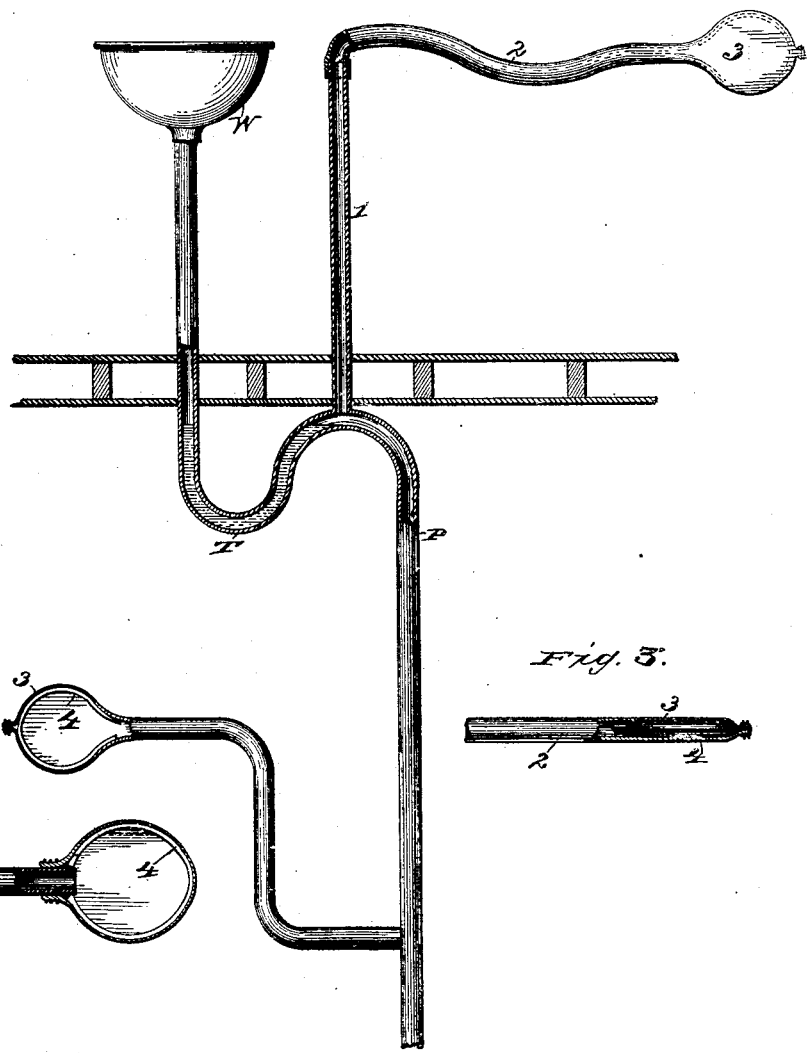

United States Patent Office.

JAMES HARRIS ROGERS, OF WASHINGTON, D. C., ASSIGNOR TO THE AMERICAN ELECTRO-GAS TELEPHONE COMPANY, OF NEW JERSEY.

PIPE-TELEPHONE.

SPECIFICATION forming part of Letters Patent No. 292,858, dated February 5, 1884.

Application filed March 6, 1883. (No model.)

*To all whom it may concern:*

Be it known that I, JAMES HARRIS ROGERS, a citizen of the United States, residing at Washington, in the District of Columbia, have invented a new and useful Improvement in Pipe-Telephones, of which the following is a specification.

My invention relates to telephone apparatus in which audible sounds are communicated through air or other gas confined in pipes. It is applicable to gas-pipes or to waste-water pipes or any other pipes which are occupied wholly or partly by air or gas, so that sound-waves communicated through such air or gas will not be completely intercepted by water.

The invention consists in the formation of a diaphragm by the stretching of rubber or other elastic material over a suitable frame and connecting such rubber with the pipe or pipes through which sound is to be transmitted; or the entire pipe may, if preferred, be constituted of rubber. My invention is conveniently applied by connecting rubber tubes at desired points with gas or waste-water pipes, which is conveniently done by stretching one end of the rubber tube over the end of the nozzle or coupling-pipe connected with the gas or water pipe through which the sound is to be transmitted, and inserting in the other end of the rubber tube an open ring or wire, which may take the form of a horseshoe, the india-rubber tube being then tightly bound over the bow of the horseshoe or stretching-frame. If preferred, the rubber to constitute the diaphragm may be made in the form of a sack, and the stretching-frame inserted therein with its ends toward the mouth of the sack, which is then drawn and tightly bound over the end of the metal pipe through which sound is to be transmitted.

In the accompanying drawings, Figure 1 is a sectional elevation of the apparatus as applied to a set of gas-pipes in a building. Fig. 2 shows the device applied to waste-water pipes. Fig. 3 is a longitudinal section of the elastic diaphragm-pipe, showing the stretching-frame within it in elevation. Fig. 4 is a section in a plane parallel with the stretching-frame, showing the modification referred to above, in which the diaphragm is made in the form of a sack, the mouth of which, after the insertion of the stretching-frame, is tied over the end of the metallic pipe.

P P represent pipes extending from one floor or apartment of a building to another. These may be gas-pipes, as illustrated in Fig. 1, or waste-water pipes, as illustrated in Fig. 2. In the latter figure, W represents a wash-basin, and T the ordinary trap in the waste-pipe. 1 1 represent nozzles inserted at any convenient point in the pipe P. In the case of waste-water pipes such nozzles should be applied at points where the air is confined by the water-traps T, or by other means, so that the nozzles 1 1 may communicate with each other through the pipe P, but not with the outer atmosphere.

In Figs. 1 and 2, 2 2 represent rubber tubes, the ends of which are stretched in customary manner over the extremities of the coupling-nozzles 1, while their other ends, 3 3, are stretched over frames 4, which may be of horseshoe shape or simple rings, around which the extremity of the stretched end of the elastic tube is tightly bound, as shown. In Fig. 4 the elastic rubber is made in the form of a sack, 3, within which the stretching-frame 4 is inserted with its extremities toward the mouth of the sack, which latter is then tightly bound around the end of the coupling-pipe 1. In either case an effective telephonic diaphragm is formed on each face of the rubber 3, through which diaphragm sound-waves may be transmitted to the air or gas in the pipes 1 P, so as to communicate audible speech or other sounds from such diaphragm 3 in one apartment to a similar diaphragm 3 in another or distant part of the building.

My invention will thus be seen to provide a very simple, effective, and complete domestic telephone system within a building of any size through the ordinary gas or waste-water pipes of said building.

All matter of my invention herein shown and described but not specifically claimed I have claimed in my co-pending application filed December 30, 1882, Serial No. 80,555, or I reserve the right to claim in future applications.

Having thus described my invention, the fol- lowing is what I claim as new therein and desire to secure by Letters Patent—

1. In combination with a tube or pipe containing confined air or gas, a projecting elastic tube closed at its outer end to confine the fluid, and provided with a sensitive diaphragm consisting of a stretched portion of the elastic tube, whereby the said diaphragm is adapted to receive and transmit sound vibrations, as described.

2. In combination with a system of pipes containing confined air or gas, a projecting tube closed at its outer end to confine the aeriform fluid, and provided with a sensitive diaphragm consisting of a stretched portion of the said elastic tube, and adapted to receive and transmit audible sounds, as described, and a second tube and diaphragm for reproducing the sounds, as set forth.

3. In combination with a system of pipes containing confined air or gas, projecting elastic tubes closed at their outer ends, and provided with sensitive diaphragms consisting of stretched portions of the said elastic tubes, as described, whereby audible sound may be transmitted and reproduced by means of the diaphragms and the aeriform fluid confined between them.

J. HARRIS ROGERS.

Witnesses:
OCTAVIUS KNIGHT,
W. J. CAHOONE.